United States Patent Office

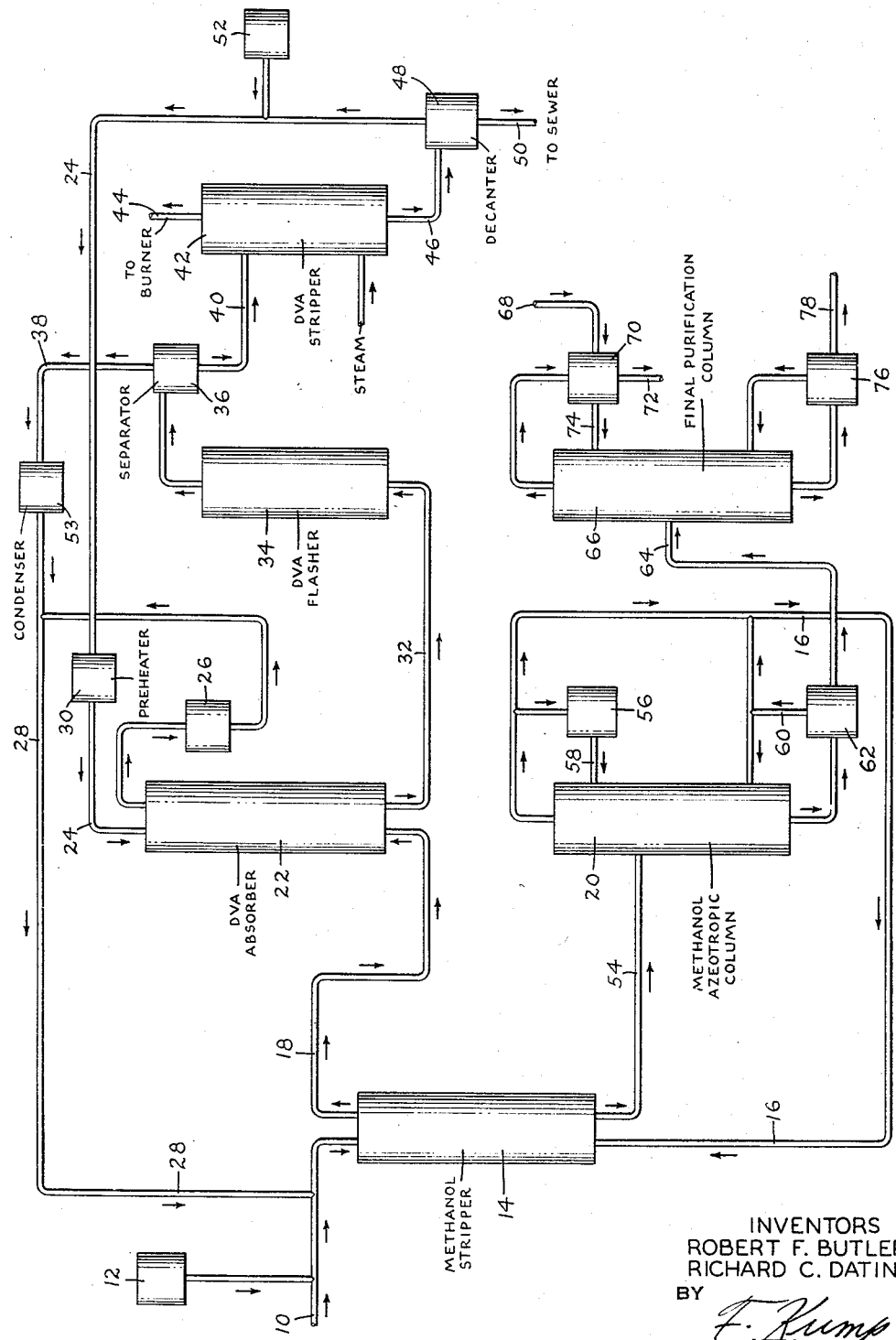

2,846,025
PROCESS FOR REMOVAL OF DIVINYLACETYLENE FROM ACRYLONITRILE

Robert F. Butler, Hopewell, and Richard C. Datin, Petersburg, Va., assignors to Allied Chemical & Dye Corporation, New York, N. Y., a corporation of New York Application January 11, 1957, Serial No. 633,712

11 Claims. (Cl. 183—115)

This invention relates to a process for the purification of acrylonitrile; more particularly, it relates to a process for removing divinylacetylene and isomeric acetylene polymers which are difficult to remove by ordinary distillation.

In view of the similarity in boiling point of acetylenic polymers and acrylonitrile, the polymers are difficult to remove by ordinary fractional distillation. Since impurities of this type promote polymerization of acrylonitrile and otherwise interfere with the application of this material to the production of materials of commercial utility, it is important that these impurities be removed.

A great many methods have been suggested for removing these materials, but for the most part, these methods are quite expensive. One of the methods which has been suggested for such purification is a method described in German Patent No. 849,839 issued September 18, 1952, to Farbenfabriken Bayer. In accordance with the therein described process, crude acrylonitrile containing 0.2 to 2% divinylacetylene is distilled with methanol which acts as an azeotropic entraining agent permitting all the divinylacetylene to be separated from the product along with the azeotrope. The methanol-free bottoms from the distillation of the azeotrope column consist of substantially divinylacetylene-free acrylonitrile and are conducted to the final product column. The arcrylonitrile is separated from the higher boiling impurities in the final column and is received overhead at a purity satisfactory for commercial utilization. The above-mentioned process, however, is inefficient and is limited to separation of small amounts of divinylacetylene. The difficulty is occasioned, for the most part, by the fact that the methanol is stripped from the liquid moving down the column before the divinylacetylene is completely removed.

It is an object of this invention to improve the purification process of the prior art so as to make it more efficient and adapted for the complete removal of the divinylacetylene and isomeric acetylene polymers.

It is a further object of this invention to improve the purification process of the prior art so as to make it possible to prepare pure acrylonitrile in an economical manner.

It has been found that these objects and other advantages incidental to the art can be attained by mixing the liquid acrylonitrile with methanol and stripping the resulting solution free of divinylacetylene and isomeric polymers with the use of a vapor mixture of acrylonitrile and methanol as a stripping agent. The divinylacetylene and isomeric acetylene polymers can then be removed from the striping vapors in a second step by contact with hot liquid kerosene. The acrylonitrile methanol solution which is essentially free of divinylactylene can be then distilled to produce methanol acrylonitrile vapors which can be recycled and used during the stripping operation.

The drawing illustrates a simplified flow sheet showing the steps involved in this invention. In accordance with the process therein shown, crude acrylonitrile containing divinylacetylene, 1-cyanobutadiene, lactonitrile, hydrogen cyanide, acetaldehyde, and other minor impurities is brought in through line 10 and is mixed with make-up methanol from tank 12 and recycled methanol acrylonitrile from line 28 to give a solution of 22 to 52%, preferably 29 to 44% by weight of methanol and fed to the top of the methanol stripping column 14. The crude acrylonitrile and the methanol may, of course, be fed separately at points near the top of the column and need not necessarily come in through one inlet as shown. Pure methanol acrylonitrile vapors essentially free of divinylacetylene from the methanol azeotropic column 20 are fed via line 16 to the bottom of stripping column 14 where they serve to strip the divinylacetylene and isomeric acetylene polymers from the crude liquid feed. This stripping vapor contains 39 to 58%, preferably 46 to 55% by weight of methanol. The stripping column is preferably operated at a temperature of 61–65° C. at atmospheric pressure. Use of other pressures would make other temperatures preferable. The vapor and liquid feed rates may be maintained at liquid to vapor mol ratio of 1.1/1 to 1.7/1, preferably at about 1.18/1 to 1.47/1. Overhead vapor from the methanol stripper containing essentially all of the divinylacetylene and the isomeric acetylene polymers is conducted through line 18 to the bottom of the divinylacetylene absorber column 22. Hot liquid kerosene is fed through line 24 to the top of the absorber 22 which is operated at a temperature lying between 75 and 90° C., preferably at 80 to 85° C. at atmospheric pressure. The kerosene during its passage through the absorber selectively absorbs the divinylacetylene and the isomeric polymers. Use of other pressures is feasible at other temperatures. The liquid to vapor molar feed ratios to the divinylacetylene absorber column are in the range of 0.4 to 3.0, preferably 0.8 to 2.0. The purified vapor is condensed in the absorber condenser 26 and recycled to the methanol stripping column 14 via line 28. Kerosene containing most of the divinylacetylene and some acrylonitrile and methanol is withdrawn from the bottom of the divinylacetylene absorber 22 via line 32 and sent to the divinylacetylene flasher 34. The divinylacetylene flasher is a long tube evaporator. The overhead vapor containing a minor portion of divinylacetylene fed to the flasher, with methanol, acrylonitrile and some kerosene is separated in separator 36, condensed in condenser 53 and recycled to the methanol stripper 14 via lines 38 and 28. The liquid from the separator 36 containing divinylacetylene, some acrylonitrile and methanol and most of the kerosene is fed via line 40 to the divinylacetylene stripper 42 wherein live steam is used to strip out the divinylacetylene. The overhead vapor from the stripper with all the divinylacetylene from the kerosene is sent to a burner via line 44. The stripper bottoms, kerosene and water, are sent via line 46 to decanter 48 where water is separated. The water phase is sent to a sewer via line 50 and the kerosene may be recycled to the divinylacetylene absorber via line 24. Kerosene make-up is supplied as needed from storage tank 52. The kerosene in line 24 is heated in preheater 30 before it is sent to divinylactylene absorber 22.

Divinylacetylene free bottoms from the methanol stripper 14 are withdrawn through line 54 and fed to a point near the top of the methanol azeotropic column 20. Methanol as the azeotrope with acrylonitrile is removed as distillate and only reflux is condensed in 56 and returned to column 20 via line 58. The overhead take off is combined with pure acrylonitrile from the methanol azeotropic column reboiler via line 60 to make up the proper vapor concentration consistent with the liquid concentration in the methanol stripper and sent to the methanol stripper as stripping vapor via line 16. A partial condenser may also be used to obtain the proper strip concentration directly without resorting to acrylonitrile make up from the reboiler. Acrylonitrile, free from methanol and divinylacetylene, is removed from reboiler 62 via line 64 and sent to final purification column 66. Column 20 is preferably operated at atmospheric pressure with a head temperature of 61–63° C. and at a bottom temeprature of 76–80° C. In the final purification column 66, polymerization inhibitor solutions are fed through line 68 and pure acrylonitrile is condensed in 70 and withdrawn as product from line 72. Reflux is provided to the column by return of condensate through 74. Heat is provided by reboiler 76 and a bottoms bleed is withdrawn from 76 via line 78, to discharge accumulated polymers and high boiling impurities for recovery or waste disposal. Column 66 is preferably operated at reduced pressures such as ½ atmospheric pressure.

The columns 14, 22, 20 and 66 in the process may be constructed of conventional plates or packed units. Whereas, the process is operated preferably in a continuous manner as described above, batchwise or semi-continuous operation may be employed in one or more steps of the process. Although preferred operation of columns 14, 22 and 20 is at atmospheric pressure, reduced or superatmospheric pressures may be employed. While it has been indicated that column 66 is preferably operated at reduced pressures, it is understood that atmospheric or subatmospheric pressures are also feasible.

The following are given as examples of the process utilizing the inventive concept herein described.

Crude acrylonitrile synthesized from acetylene and hydrogen cyanide in the presence of an aqueous copper catalyst had the following composition:

| | Percent by weight |
|---|---|
| Acrylonitrile | 93.7 |
| Divinylacetylene | 1.7 |
| Cyanobutadiene | 4.0 |
| Lactonitrile | 0.1 |
| Aldehydes | 0.3 |
| Water | 0.2 |

This mixture was treated by the process illustrated and outlined in the preceding section. Crude acrylonitrile was mixed with methanol to form a 43.5% by weight methanol solution and was fed to the methanol stripper 14. The methanol stripper was a packed column, 2 inches in diameter having the equivalent of 35 theoretical plates. The crude feed was introduced at the top of the stripper column at a rate of 122 ml./min. at a temperature of 60° C. The column was operated at atmospheric pressure under substantially isothermal conditions and the acrylonitrile and methanol were in phase equilibrium throughout the column. Sufficient divinylacetylene free acrylonitrile obtained from reboiler 62 was admixed with the methanol obtained as overhead from column 20 to make a 54% methanol acrylonitrile mixture. This mixture in vapor form was then fed to the bottom of the methanol stripper at a rate to give a liquid to vapor molar feed ratio of 1.18 in this operation. An essentially divinylacetylene free bottoms stream containing 43.5 percent methanol, 52–54 percent acrylonitrile and the rest heavy impurities was withdrawn at 64° C. at a rate of 122 ml./min. from the reboiler 62. Distillate was removed from stripper 14 at 63° C. at a rate of 98 ml./min. and contained 54 percent, by weight, methanol 0.9 percent divinylacetylene and the rest acrylonitrile and minor impurities. This distillate contained essentially all of the divinylacetylene present in the crude feed. Column 14 was operated at substantially isothermal conditions. The temperatures were 63° C. at the top, center, and bottom points. Part of the distillate vapor from the methanol stripper was fed at a rate of 54 ml./min. (measured as liquid) to the bottom of a 2-inch diameter divinylacetylene absorbing column 22 rated at about 10 theoretical plates. Kerosene preheated to about 85° C. was fed to the top of the column 22 at a rate of 203 ml./min. at atmospheric pressure. The liquid to vapor molar feed ratio was, therefore, 0.8 to 1. Column temperatures were 80–85° C. Distillate was removed at a rate of 46 ml./min. and contained 39.4 weight percent acrylonitrile, 0.27 percent divinylacetylene, 1 percent kerosene and the rest largely methanol. The bottoms kerosene stream was removed at a rate of 216 ml./min. at 80° C. and contained about two-thirds of the divinylacetylene fed to the column. About 75% of the acrylonitrile contained in the bottoms kerosene was distilled from the kerosene by a simple flash distillation process. A long tube evaporator was effective for this purpose. The kerosene was purified for recycle by steam stripping.

A portion of the bottoms stream from the methanol stripper 14 was fed at 24 ml./min. to the middle of the methanol azeotropic column 20. The latter was a 2-inch diameter column rated at about 15 theoretical plates and operated at a reflux ratio of 2 to 1 at atmospheric pressure. Distillate essentially free of divinylacetylene was removed overhead from column 20 at 63° C. at a rate of 18 ml./min. and contained 42% acrylonitrile with the rest essentially methanol. Bottoms stream from the reboiler 62, operating at 80° C., was removed at a rate of 6 ml./min., was free of methanol and divinylacetylene and consisted of acrylonitrile with heavy impurities. The operation and feed rates were controlled to maintain column temperatures of 70°, 68° and 63° C. at the bottom, middle and top, respectively. The bottoms stream from the methanol azeotropic column 20 was fed to the middle of the final purification column rated at about 22 theoretical plates and operated at 8 to 1 reflux ratio at one-half atmospheric pressure. Distillate was removed overhead at 57° C. and met requirements for a fibre grade product, e. g., less than 5 parts per million each of divinylacetylene, hydrogen cyanide, and cyanobutadiene, less than 500 p. p. m. methylvinylketone and less than 0.5% water. The bottoms stream was removed from the reboiler 76 at 60°–65° C. to discharge accumulated polymers and heavy impurities. A conventional polymerization inhibitor was fed at the top of the column.

Vapor-liquid equilibrium studies have shown that the close relative volatility between divinylacetylene and acrylonitrile can be altered by the use of methanol in a ternary system. The addition of sufficient methanol to crude mixtures of acrylonitrile containing divinylacetylene, and other impurities, enhances the volatility of divinylacetylene and facilitates its removal from acrylonitrile in normal vapor-liquid contacting columns.

Previous attempts to make use of methanol for divinylacetylene removal in rectification were very inefficient and limited to separation of small amounts of divinylacetylene. It has been found that the difficulty of rectification with methanol was due to the fact that methanol was stripped from the liquid moving down the column before the divinylacetylene was completely removed; whereas it is essential to retain a major portion of the methanol in the liquid until the divinylacetylene has been separated. The process herein described avoids this loss of methanol from the liquid phase by use of a stripping vapor that is of a higher methanol content than the liquid stream. Preferably, the acrylonitrile and methanol are in phase equilibrium throughout the methanol stripper column.

The operation of the methanol stripper is preferably based to some degree on the divinylacetylene content of the crude liquid feed. Normally, the crude acrylonitrile contains less than 5% divinylacetylene and separation can be effected by a methanol stripper liquid feed concentration of say, 43% (by weight) methanol. The process is so flexible that separation can be effected with crudes containing as high as 11.5% divinylacetylene by using a methanol stripper feed concentration of 52% methanol.

Some of the equilibrium concentrations involved in preferred formulation of feeds to the methanol stripper are summarized in the following table.

*Methanol stripper compositions*

| Maximum Permissible divinylacetylene in crude acrylonitrile, Weight percent | Weight percent Methanol in Feeds | |
|---|---|---|
| | Crude Liquid | Stripping Vapor |
| 2.5 | 35.5 | 50.5 |
| 3.5 | 39.5 | 52.2 |
| 4.2 | 41.0 | 52.9 |
| 5.0 | 43.5 | 57.0 |
| 7.3 | 47.7 | 55.8 |
| 11.5 | 51.8 | 57.5 |

In the operation of the divinylacetylene absorber column, the most sensitive process variable appears to be the temperature of operation. With the range 75 to 90° C. and at about atmospheric pressure, low temperature results in greater amounts of acrylonitrile being removed in the kerosene, while high temperature results in less efficient divinylacetylene removal by the kerosene.

In the preferred form of the process, crude acrylonitrile is kept essentially dry. The exclusion of water from the process is beneficial but not essential. Acrylonitrile and water form a minimum boiling azeotrope (71° C.) containing 12 weight percent water which is more difficult to separate from the methanol-acrylonitrile azeotrope boiling at 62° C. than acrylonitrile alone (77.5° C.). In such an alternative but less desirable procedure, drying can be carried out just prior to the final distillation step with methanol azeotrope column bottoms as wet feed.

Although certain preferred embodiments of the invention have been disclosed for purpose of illustration, it will be evident that various changes and modifications may be made therein without departing from the scope and spirit of the invention.

We claim:

1. In the method of purifying acrylonitrile containing divinylacetylene, the steps comprising mixing acrylonitrile with methanol, stripping the resulting liquid mixture free of divinylacetylene by bringing it into intimate contact with a vapor mixture of acrylonitrile and methanol in a column operating under substantially isothermal conditions and wherein the acrylonitrile and methanol are in phase equilibrium throughout said column and subsequently separating the purified acrylonitrile from the treated acrylonitrile methanol mixture by distillation.

2. In the method of purifying acrylonitrile containing divinylacetylene the steps comprising mixing the acrylonitrile with methanol to form a liquid mixture, passing said liquid mixture through a column in countercurrent with a vapor mixture of acrylonitrile and methanol introduced into said column through a secondary opening thereby stripping divinylacetylene therefrom and subsequently separating the acrylonitrile from the treated liquid mixture by distillation.

3. In the method of purifying acrylonitrile containing divinylacetylene the steps comprising mixing the acrylonitrile with methanol to form a liquid mixture, passing said liquid mixture through a stripping column in countercurrent with a vapor mixture of acrylonitrile with methanol thereby stripping divinylacetylene therefrom, said column operating under substantially isothermal conditions and with the acrylonitrile and methanol in phase equilibrium, subsequently separating the acrylonitrile from the treated liquid mixture by distillation and removing divinylacetylene contained therein from the resulting vapor mixture leaving said stripping column by contacting it with hot kerosene.

4. In the method of purifying acrylonitrile containing divinylacetylene the steps comprising mixing acrylonitrile with methanol, to form a solution containing 22–52% methanol, stripping the resulting liquid mixture free of divinylacetylene by bringing it into contact with a vapor mixture of acrylonitrile and methanol containing 39–58% methanol in a column operating under substantially isothermal conditions and with the acrylonitrile and methanol in phase equilibrium and subsequently separating the acrylonitrile from the treated acrylonitrile methanol mixture by distillation.

5. In the method of purifying acrylonitrile containing divinylacetylene the steps comprising mixing the acrylonitrile with methanol to form a solution containing 22–52% methanol, passing said solution through a stripping column in countercurrent with a vapor mixture of acrylonitrile and methanol containing 39–58% methanol thereby stripping divinylacetylene therefrom, said column operating under substantially isothermal conditions and with the acrylonitrile and methanol in phase equilibrium, and subsequently separating the acrylonitrile from the treated solution leaving the stripping column by distillation.

6. In the method of purifying acrylonitrile containing divinylacetylene the steps comprising mixing the acrylonitrile with methanol to form a liquid mixture containing 22–52% methanol, passing said liquid mixture through a stripping column in countercurrent with a vapor mixture of acrylonitrile with methanol containing 39–58% methanol thereby stripping divinylacetylene therefrom, said column operating under substantially isothermal conditions and with the acrylonitrile and methanol in phase equilibrium and subsequently separating the acrylonitrile from the treated liquid mixture by distillation and removing divinylacetylene from the resulting vapor mixture leaving said stripping column by contacting it with hot kerosene.

7. In the method of purifying acrylonitrile containing divinylacetylene the steps comprising mixing the acrylonitrile with methanol to form a liquid mixture, passing said liquid mixture through a stripping column operated at a substantially isothermal temperature of 61–68° C. in countercurrent with a vapor mixture of acrylonitrile with methanol thereby stripping divinylacetylene therefrom and subsequently separating the acrylonitrile from the treated liquid mixture by distillation and removing divinylacetylene from the resulting vapor mixture leaving said stripping column by contacting it with hot kerosene at a temperature between 75° and 90° C.

8. In the method of purifying acrylonitrile containing divinylacetylene the steps comprising mixing the acrylonitrile with methanol to form a liquid mixture, passing said liquid mixture containing 22–52% methanol through a stripping column operated at a substantially isothermal temperature of 61–65° C. in countercurrent with a vapor mixture of acrylonitrile with methanol containing 39–58% methanol, thereby stripping divinylacetylene therefrom and subsequently separating the acrylonitrile from the treated liquid mixture by distillation and removing divinylacetylene from the resulting vapor mixture leaving said stripping column by contacting it with hot kerosene at a temperature between 75 and 90° C.

9. In the method of purifying acrylonitrile containing divinylacetylene the steps comprising mixing the acrylonitrile with methanol to form a liquid mixture containing 22–52% methanol, passing said liquid mixture through a stripping column operated at 61–65° C. and under acrylonitrile and methanol phase equilibrium conditions throughout said column in countercurrent with a vapor mixture of acrylonitrile and methanol containing 39–58% methanol thereby stripping divinylacetylene therefrom and subsequently separating the acrylonitrile from the treated liquid mixture by distillation.

10. In the method of purifying acrylonitrile containing divinylacetylene the steps comprising mixing the acrylonitrile with methanol to form a liquid mixture, passing said liquid mixture through a stripping column in countercurrent with a vapor mixture of acrylonitrile with methanol thereby stripping divinylacetylene therefrom, said column operating under substantially isothermal conditions and with the acrylonitrile and methanol in phase equilibrium, subsequently separating the acrylonitrile from the treated liquid mixture by distillation, removing divinylacetylene and some acrylonitrile contained therein from the resulting vapor mixture leaving said stripping column by contacting it with hot kerosene, and passing the hot kerosene through a flash distillation column to remove acrylonitrile contained therein and recycling the removed acrylonitrile by returning it to said stripping column.

11. In the method of purifying acrylonitrile containing divinylacetylene the steps comprising mixing the acrylonitrile with methanol to form a liquid mixture, passing said liquid mixture containing 22–52% methanol through a stripping column operated at a substantially isothermal temperature of 61–65° C. in countercurrent with a vapor mixture of acrylonitrile with methanol containing 39–58% methanol, thereby stripping divinylacetylene therefrom and subsequently separating the acrylonitrile from the treated liquid mixture by distillation and removing divinylacetylene and some acrylonitrile from the resulting vapor mixture leaving said stripping column by contacting it with hot kerosene at a temperature between 75 and 90° C., and passing the hot kerosene with the absorbed material through a flash distillation column to remove acrylonitrile contained therein and recycling the removed acrylonitrile by returning it to said stripping column.

References Cited in the file of this patent

FOREIGN PATENTS 849,839    Germany _____ Sept. 18, 1952

UNITED STATES PATENT OFFICE
CERTIFICATE OF CORRECTION

Patent No. 2,846,025

August 5, 1958

Robert F. Butler et al.

It is hereby certified that error appears in the above numbered patent requiring correction and that the said Letters Patent should read as corrected below.

In the grant, lines 2 to 4, for "assignors to Allied Chemical & Dye Corporation, of New York, N. Y., a corporation of New York," read -- assignors to Allied Chemical Corporation, a corporation of New York, --; line 13, for "Allied Chemical & Dye Corporation, its successors" read -- Allied Chemical Corporation, its successors --; in the heading to the printed specification, lines 5 to 7, for "assignors to Allied Chemical & Dye Corporation, New York, N. Y., a corporation of New York" read -- assignors to Allied Chemical Corporation, a corporation of New York --; column 1, line 65, for "striping" read -- stripping --.

Signed and sealed this 24th day of February 1959.

(SEAL)

Attest:
KARL H. AXLINE
Attesting Officer

ROBERT C. WATSON
Commissioner of Patents